United States Patent [19]

Short, III et al.

[11] Patent Number: 4,463,356

[45] Date of Patent: Jul. 31, 1984

[54] APPARATUS FOR CONTROL OF CLUTTER BREAKTHROUGH IN MTI RADAR

[75] Inventors: Robert D. Short, III, Littleton; Clarence L. Bennett, Jr., Groton; Richard M. Barnes; Robert S. Smith, both of Acton, all of Mass.; Harold W. Pyle, Burnsville, Minn.

[73] Assignee: Sperry Corporation, New York, N.Y.

[21] Appl. No.: 293,730

[22] Filed: Aug. 17, 1981

[51] Int. Cl.³ .............................................. G01S 9/42
[52] U.S. Cl. .................................... 343/7.7; 343/7 A
[58] Field of Search ................................ 343/7.7, 7 A

[56] References Cited

U.S. PATENT DOCUMENTS

| | | | |
|---|---|---|---|
| 3,599,208 | 8/1971 | Nelson | 343/5 NQ |
| 3,968,490 | 7/1976 | Gostin | 343/7.7 |
| 4,143,371 | 3/1979 | Salvaudon et al. | 343/7 A |

Primary Examiner—Maynard R. Wilbur
Assistant Examiner—M. R. Gordon
Attorney, Agent, or Firm—Howard P. Terry; Seymour Levine

[57] ABSTRACT

An apparatus for control of ground clutter breakthrough in MTI radar which remove hard limited clutter signals while allowing increased detection sensitivity to moving targets when such strong clutter returns are not present. Logic is provided to prevent the removal of strong moving target return even in the presence of hard limited clutter.

5 Claims, 3 Drawing Figures

APPARATUS FOR CONTROL OF CLUTTER BREAKTHROUGH IN MTI RADAR

BACKGROUND OF THE INVENTION

1. Field of the Invention

The invention relates to radar systems and more particularly to moving target indication (MTI) radar systems which separate moving targets from stationary ground clutter by utilizing the doppler frequency shift imparted to radar signal returns from moving targets.

2. Description of the Prior Art

Moving target indication (MTI) processing is necessary in air traffic control (ATC) radars to detect the airborne targets in the presence of fixed ground clutter, the echo signals from which are orders of magnitude greater than the echo signals from the airborne targets. The basic MTI concepts were formulated during the massive radar developmental program performed during World War II. Work in this area was continued in post war years and today most modern search radars include some type of MTI processor to detect moving targets in the presence of clutter. The early systems, however, have limited sub-clutter visibility, i.e., the target signal level below the clutter level with which the target may be detected. These radars exhibit limited clutter cancellation, reporting unwanted targets due to ground clutter returns, and are expensive to operate and maintain. By exploiting today's digital technology, major improvements in MTI performance may be obtained economically and reliably.

In many modern MTI radar systems, a limiter is coupled between the i.f. amplifier and the MTI processor to reduce the clutter cancellation burden imposed on the processor. The limit is set to attenuate the clutter from large ground returns, such as mountains, by 20 or 30 dB, while return signals from targets of interest are well below the limiting level. The signal from the limiter is then coupled to the MTI processor in which the clutter signals due to large ground echoes are further reduced to provide residues at the output terminals of the MTI processor that are comparable with receiver noise. Unfortunately, the non-linear action of the limiter causes the spectrum of strong clutter returns to be spread into the passbands of the MTI canceller. This clutter residue, which is generally highly correlated over the pulses that occupy a beam width of data, causes greatly reduced target sensitivities and greatly increased false alarm rates.

The present invention is directed to an improved MTI radar wherein the effects of hard limited clutter are significantly reduced thereby decreasing the false alarm rate and providing increased detection sensitivity to moving airborne targets.

SUMMARY OF THE INVENTION

The present invention provides an improved clutter canceller for an MTI radar system in which the i.f. signal of large clutter returns are hard limited prior to coupling to the MTI processor. A preferred embodiment of the invention includes an amplitude detector coupled in parallel to the i.f. input terminals of the MTI processor wherefrom the detected signal amplitude is coupled to the negative terminal of a difference amplifier comparator, the positive terminal of which is coupled to receive a threshold signal set at a level that may be 1 dB below the amplitude corresponding to i.f. limiting. The output of the comparator is coupled to the logic input of an analog switch which receives a digital ONE when the threshold exceeds the signal amplitude and digital ZERO when the threshold does not exceed the signal amplitude. The analog input of the analog switch is coupled to receive the detected output signal from the MTI processor. This signal is passed through the AND gate, when a digital ONE is coupled from the comparator to the video processing circuitry.

In a second preferred embodiment of the invention, the output terminal of the difference amplifier comparator is coupled to one input terminal of an OR gate, the output terminal of which is coupled to one input terminal of the AND gate, the second input terminal of the AND gate is coupled to receive the detected output signal of the MTI processor as previously described. A second difference amplifier comparator has its positive input terminal coupled in parallel to the input terminal of the detector coupled to receive the MTI processor output signal and its negative terminal coupled to receive a threshold signal that is set at a level that may be 1 dB above the level of the MTI video for a zero velocity ground clutter target 1 dB below the i.f. limiting. The output terminal of the second difference amplifier is coupled to a second input terminal of the OR gate to which a digital ONE is coupled when the level of the signal from the MTI processor exceeds the second threshold, and a digital ZERO is coupled when this signal level does not exceed the second threshold. In this second embodiment, the detected video is coupled through the AND gate when any combination of digital ONES is coupled to the input terminals of the OR gate and no signal is coupled to the video processing circuitry when two digital ZEROES are coupled thereto.

DESCRIPTION OF THE PREFERRED EMBODIMENTS

Figure 1:
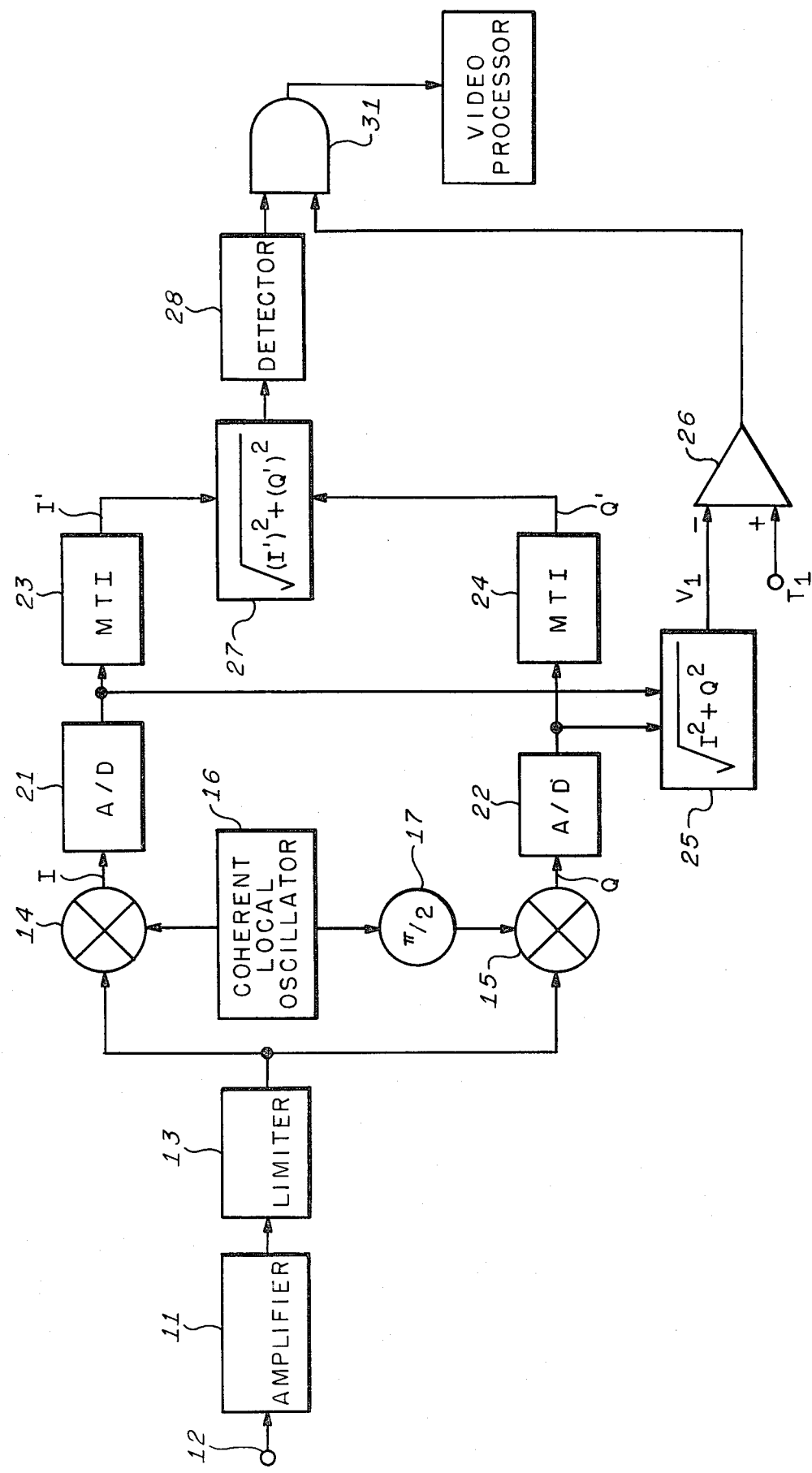
FIG. 1 is a block diagram of a preferred embodiment of the invention.

Referring to FIG. 1, the principal components of an MTI processor with ground clutter control may include an i.f. amplifier 11 coupled to receive i.f. signals from an input terminal 12 and having an output terminal coupled to an i.f. limiter 13. The output terminal of the i.f. limiter is coupled to a first mixer 14 and a second mixer 15. A coherent local oscillator 16 is coupled to mixer 14 and, through a 90° phase shifter 17, to mixer 15. Analog-to-digital (A/D) converters 21 and 22 have input terminals respectively coupled to the output terminals of mixers 14 and 15 and their output terminals respectively coupled to digital MTI processors 23 and 24. The output terminals of the A/D converters are also coupled to a signal combiner 25 having its output terminal coupled to the negative terminal of a difference amplifier comparator 26 to the positive terminal of which a threshold signal is coupled. A second signal combiner 27 is coupled to the output terminals of the MTI processors 23 and 24, the output terminal of which is coupled to an amplitude detector 28. An AND gate 31 has one input terminal coupled to the output terminal of detector 28 and a second input terminal coupled to the output terminal of difference amplifier comparator 26 and its output terminal coupled to the video processor of the radar system.

An i.f. signal coupled to input terminal 12 is coupled to limiter 13 after amplification by i.f. amplifier 11. The i.f. limiter 13 imposes a limit on the level of the signal coupled to mixers 14 and 15. This limit is set such that the output signals from the MTI processors 23 and 24, for a ground clutter limited signal coupled from limiter 13 to mixers 14 and 15, are at the level of the ambient receiver noise. The signals at the output terminals of the i.f. amplifier 13 are mixed with the signal from a coherent local oscillator and the 90° phase shifted signal therefrom to provide a signal at the output of mixer 14 that is in-phase with the coherent local oscillator and the signal at the output terminal of mixer 15 that is in quadrature therewith. The in-phase and quadrature components are respectively coupled to A/D converters 21 and 22, wherefrom they are coupled to MTI processors 23 and 24 and to the first signal combiner 25. The output signal from the signal combiner 25, which is the square root of the sum of the squares of the in-phase and quadrature components of the digitized i.f. signal, is coupled to the negative terminal of the difference amplifier comparator 26. The positive terminal of difference amplifier comparator 26 is coupled to receive a threshold signal which is set at an MTI video level ($V_1$) resulting from a target producing an i.f. level 1 dB below limiting. When the signal at the negative terminal of the difference amplifier comparator 26 exceeds the threshold level, indicating that the i.f. signal at the input to the limiter 13 is at least at the limiting level, a digital ZERO is coupled to the output terminal of the difference amplifier comparator 26. When the signal coupled to the difference amplifier comparator 26 does not exceed the threshold, a digital ONE is coupled to the output terminal. The I and Q components at the output terminals of the A/D converter are also coupled to MTI processors 23 and 24 wherein the I and Q components of the clutter are reduced to the receiver noise level and substantially clutter free signals are coupled from the processors to the signal combiner 27 wherein the two components are combined to form a digital i.f. signal that is coupled to detector 28 from which a video signal is coupled to AND gate 31. When a digital ZERO is coupled from difference amplifier comparator 26 to AND gate 31, the digital video signal from detector 28 does not couple through AND gate 31, thus blanking the video processor. This blanking reduces the false alarms due to ground clutter breakthrough substantially to zero. When the signal coupled from difference amplifier 26 to AND gate 31 is a digital ONE, indicating that the i.f. signal does not exceed the limiting value, the signal at the output terminal of detector 28 is coupled through AND gate 31 to the video processor.

Figure 2:
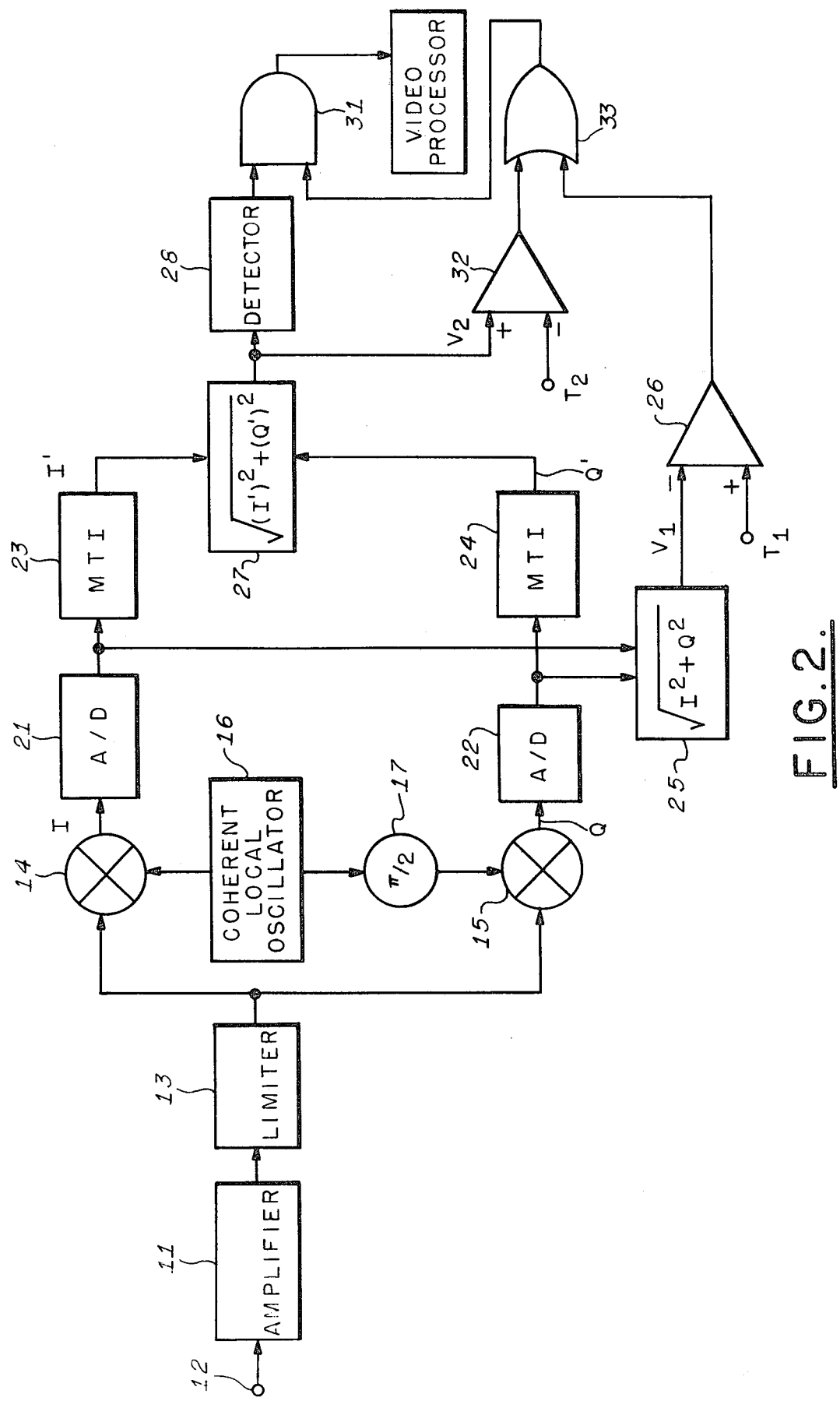
FIG. 2 is a block diagram of a second preferred embodiment of the invention.

It will be recognized by those skilled in the art that the embodiment of FIG. 1 will prevent the coupling of video signals to the video processor whenever an amplified i.f. signal that exceeds the limiting level is coupled to the limiter 13. This signal blockage will occur for strong targets with non-zero doppler shifted frequencies that exceed this limiting level as well as for strong ground clutter returns. A modification of the invention which prevents the cancellation of such strong wanted target returns is shown in FIG. 2, wherein each element that is common to FIGS. 1 and 2 bears the same reference numeral. A second difference amplifier comparator 32 has its positive terminal coupled to the output terminal of the second signal combiner 27 and its negative input terminal coupled to receive a threshold signal which may be set at a level 1 dB above the level of the MTI video for a zero velocity ground clutter target 1 dB below the i.f. limiting value. The output terminals of difference amplifiers comparator 26 and 32 are coupled to the first input terminals of an OR gate 33 having its output terminal coupled to input terminal of AND gate 31.

When the signal level at the output terminal of the second combiner 27 exceeds the threshold value $T_2$, a digital ONE is coupled from the output terminal of the difference amplifier comparator 32 to the OR gate 33. Thus, though this strong moving target may cause a digital ZERO to be coupled from the difference amplifier comparator 26 to OR gate 33, a digital ONE (enable signal) will be coupled from the output terminal of OR gate 33 to the input terminal of AND gate 31, permitting a video signal representative of the strong moving target to be coupled from detector 28 to the video processor. It should be recognized that a digital ONE will be coupled from the output terminal of OR gate 33 to AND gate 31 whenever a digital ONE is coupled to either or both of the input terminals of OR gate 33. Signal blockage to the video processor occurs only when two digital ZEROES are coupled to OR gate 33, i.e., whenever the output signal $V_2$ from the second chamber 27 does not exceed the threshold $T_2$ and the signal level $V_1$ at the output terminals of the first signal combiner 25 exceeds the threshold $T_1$. When this condition exists, a strong clutter return exceeding the limiting value and a signal return at least 1 dB below this limiting value, a digital ZERO (disable signal) is coupled to AND gate 31 causing blockage of the video signals from detector 28 to the video processor.

Figure 3:
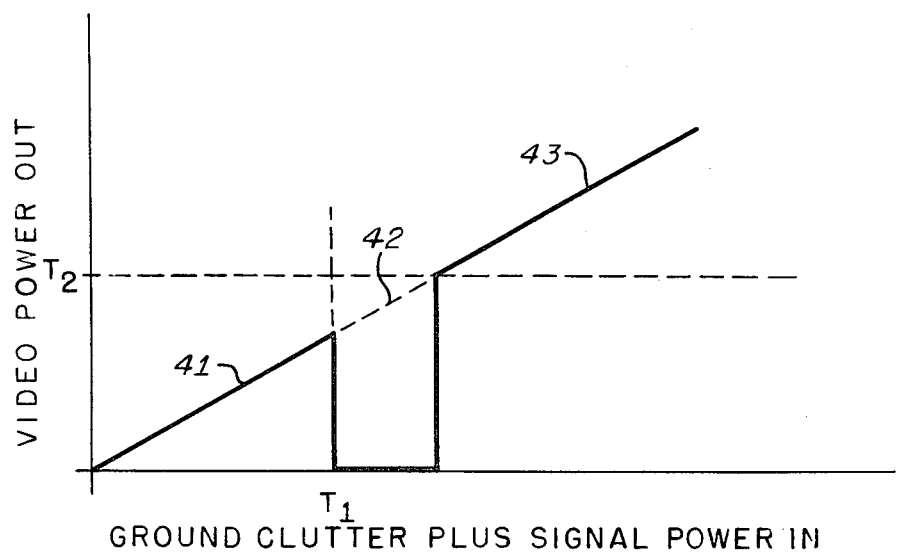
FIG. 3 is a diagram indicating the signal level regions for which video signals are not coupled to the video processing circuit.

A graphical representation of the video signal power coupled to the video processor as a function of the ground clutter plus target i.f. signal input is shown in FIG. 3. The region 41 below the threshold $T_2$ and to the right of the threshold $T_1$ represent the conditions for which video signals from the detector 28 are blocked from the video processor. Consider a clutter free signal with a signal power out versus signal power in function represented by the three section curve 41, 42, and 43. In the region to the left of the threshold $T_1$, and below the threshold $T_2$, these signals will pass through the system as though no clutter were present. In the region to the right of $T_1$ but below $T_2$, where the clutter signal is sufficiently strong to exceed the threshold $T_1$ and the target signal is not of sufficient strength to exceed the threshold $T_2$, video signals from the detector 27 are prevented from being coupled to the video processor as above-described and the video power out becomes zero. When the clutter free signal, as shown on segment 43, exceeds the threshold $T_2$, the AND gate 31 is enabled by a digital ONE from the OR gate 33, permitting the digital signal at the output terminal of detector 28 to be coupled to the video processor and traverse its normal path through the system.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a radar system of the type including an i.f. signal amplifier coupled to moving target indicator (MTI) processor means, a detector coupled to the MTI processor means, and a video processor coupled to the detector, wherein the improvement comprises:

means coupled in parallel with said MTI processor means for providing signals representative of magnitudes of i.f. signals coupled to said MTI processor means;

first comparator means coupled to receive said magnitude representative signals, and a first threshold signal for providing a first signal when said magnitude representative signals exceed, said first threshold signal, and a second signal when said magnitude representative signals do not exceed said first threshold signal; and first gate means coupled to receive signals from said detector and said first comparator means for providing signals from said detector to said video processor when said second signal is coupled to said first gate mean and for blocking signals from said detector to said video processor when said first signal is coupled to first said gate means.

2. An improved radar system in accordance with claim 1, the improvement further including:

second comparator means coupled to receive signals from said MTI processor means and a second threshold signal for providing a first signal when said signals from said MTI processor means have magnitudes that do not exceed said second threshold signal and a second signal when said signals received from said MTI processor means have magnitudes that exceed said threshold signal;

second gate means coupled to said first and second comparator means for coupling a disable signal to said first gate means when said first signal from said first comparator means and said first signal from said second comparator means are simultaneously coupled thereto and an enable signal for all other combinations of said first and second signals coupled from said first and second comparators means, whereby said first gate means provides signals from said detector to said video processor when said enable signal from said second gate means is coupled to said first gate means and blocks signals from said detector to said video processor when said disable signal from said second gate means is coupled to said first gate means.

3. An improved radar system in accordance with claim 2 wherein said first gate means comprise AND gates and said second gate means comprise OR gates.

4. An improved radar system in accordance with claim 2 wherein said first and second comparators are digital difference amplifiers.

5. An improved radar system in accordance with claims 1, 2, 3 or 4 wherein said MTI processor means includes first and second digital processor means for respectively processing first and second components of i.f. signals coupled thereto in digital format, said detector is a digital detector and said radar system is of the type which further includes:

first and second mixer means coupled to receive i.f. signals;

local oscillator means coupled to said first and second mixer means in a manner to provide signals representative of first and second components of said i.f. signals respectively;

first and second analog-to-digital (A/D) converter means coupled respectively between said first and second digital processor means of said MTI processor means and said first and second mixer means for respectively converting said first and second components from analog signals to digital signals; and means coupled respectively between said first and second digital processor means and said digital detector for combining said first and second components to provide digital signals to said digital detector that are representative of magnitudes of said i.f. signals.

* * * * *